Patented Aug. 16, 1949

2,479,109

UNITED STATES PATENT OFFICE 2,479,109

ALUMINA-PLATINUM-HALOGEN CATALYST
AND PREPARATION THEREOF

Vladimir Haensel, Clarendon Hills, Ill., assignor to Universal Oil Products Company, Chicago, Ill., a corporation of Delaware No Drawing. Application November 28, 1947, Serial No. 788,672

20 Claims. (Cl. 252—442)

This invention relates to the manufacture of catalysts and particularly to the manufacture of platinum-containing catalysts. In another embodiment the present invention relates to a novel composition of matter comprising these catalysts.

Platinum-containing catalysts and various methods of manufacturing the same have heretofore been suggested. These catalysts have been of limited commercial acceptance because of the high cost thereof. The present invention is based on the discovery that exceptionally good catalysts may be prepared by specific methods of preparation to be hereinafter described in detail.

In one embodiment the present invention relates to a method of preparing a catalyst which comprises commingling a halogen with alumina, compositing platinum therewith, and subsequently heating the composite.

In another embodiment the present invention relates to a method of preparing a catalyst which comprises forming a mixture of alumina containing from about 0.5 to about 8% by weight of a combined halogen, and thereafter compositing platinum therewith.

In a specific embodiment the present invention relates to a method of preparing a catalyst which comprises precipitating alumina from aluminum chloride, commingling hydrogen fluoride therewith in an amount of fluorine from about 0.1 to about 3% by weight of said alumina, adding hydrogen sulfide to a chloroplatinic acid solution, commingling the resultant solution with said alumina, and thereafter heating the resultant composite at a temperature of from about 800 to about 1200° F.

In another specific embodiment the present invention relates to a method of preparing a catalyst which comprises adding a basic precipitant to aluminum chloride to form alumina, selectively washing said alumina to retain chloride ions in an amount of from about 0.2 to about 8% by weight of said alumina, adding hydrogen sulfide to a chloroplatinic acid solution, commingling the resultant solution with said alumina, and thereafter heating the resultant composite at a temperature of from about 800° to about 1200° F.

In still another embodiment the present invention relates to a novel composition of matter comprising alumina, platinum and from about 0.1% to about 5% by weight of a combined halogen.

As hereinbefore set forth, applicant has found that exceptionally good catalysts are prepared in accordance with the novel features of the present invention. While these catalysts may contain larger concentrations of platinum, which may range up to about 10% by weight or more of the alumina, it has been found that exceptionally good catalysts may be prepared to contain as low as from about 0.01% to about 1% by weight of platinum. Catalysts of these low platinum concentrations are particularly preferred in the present invention because of the considerably lower cost of the catalyst. It is well known that platinum is very expensive and any satisfactory method of reducing the amount of platinum required in catalysts considerably reduces the cost of the catalyst and thus enhances the attractiveness of the catalyst for use in commercial processes. The platinum generally comprises a major portion of the cost of the catalyst and, therefore, by reducing the amount of platinum required to one half, for example, reduces the cost of the catalyst substantially by one half. Further, for example, when the amount of platinum is reduced to about 0.1% by weight as against 5% by weight, or more, as heretofore required, it is readily apparent that the cost of the catalyst is reduced by at least 50 times.

However, in order to obtain improved results with these low platinum concentrations, it is necessary that a particular type of supporting component must be composited with the platinum. It has been found that alumina shows unexpected advantages for use as a supporting component for the low platinum concentrations, apparently due to some peculiar association of the alumina with the platinum, either as a chemical combination or merely as a physical association. It has been found that the specific combination of alumina and low platinum concentration is not only a very active catalyst, but also has a long catalyst life; that is, the catalyst retains its high activity for long periods of service. After these long periods of service, the catalyst may show a drop in activity and it has further been found that the particular combination of alumina and platinum renders the catalyst susceptible to ready regeneration.

To further improve these catalysts, it is an essential feature of the present invention that the final catalyst contains halogen ions in a specific concentration. It has been found, and will be shown in the following examples, that the presence of halogen ions within a specific range enhances the initial activity of the catalyst and also serves to increase the life of the catalyst. It is believed that the halogen enters into some chemical combination or loose complex with the alumina and/or platinum, and thereby serves to improve the final catalyst.

While any of the halogen ions will serve to effect improved results, the fluoride ions are preferred. Next in order are the chloride ions, while the bromide and iodide ions are generally less preferred. It is understood that, while all of these halogens will serve to effect an improvement, they are not necessarily equivalent.

The catalyst of the present invention may be prepared in any suitable manner, a particularly preferred method is to prepare alumina by adding a suitable reagent, such as ammonium hydroxide, ammonium carbonate, etc. to a salt of aluminum, such as aluminum chloride, aluminum sulfate, aluminum nitrate, etc. in an amount to form aluminum hydroxide which upon drying is converted to alumina and, in the interest of simplicity, the aluminum hydroxide is referred to as alumina in the present specification and claims in order that the percentages are based on alumina free of combined water. It has been found that aluminum chloride is generally preferred as the aluminum salt, not only for convenience in subsequent washing and filtering procedures, but also because it appears to give best results. Another suitable method is to react sodium aluminate with aluminum chloride or other suitable aluminum salt in order to prepare the alumina.

After the alumina has been formed, it is generally washed to remove soluble impurities. Usual washing procedures comprising washing with water, either in combination with filtration or as separate steps. It has been found that filtration of the alumina is improved when the wash water includes a small amount of ammonium hydroxide. The severity of washing will depend upon the particular method employed in preparing the catalyst. In one embodiment of the invention, the alumina is thoroughly washed with a suitable amount of water and preferably water containing ammonium hydroxide to reduce the chlorine content of the alumina to below about 0.1%. In another embodiment of the invention this washing may be selective to retain chloride ions in an amount of from about 0.2% to about 5% by weight of the alumina on a dry basis. In accordance with this method of preparing the catalyst, the chloride ions are obtained from the original aluminum chloride and are retained in the alumina, thus avoiding the necessity of adding the halogen ions in a later step of catalyst preparation. However, it generally is difficult to control the washing procedure to retain the desired amount of halogen ion and, for this reason, it usually is preferred to wash the alumina to remove substantially all of the chloride ions and thereafter add the halogen ions in a controlled amount. The addition of the halogen ions in this manner permits better control of the amount of halogen ions being added. In another embodiment of the invention, the washing may be selective to retain the chloride ions in an amount constituting a portion of the total halogen desired, and the remaining portion of the halogen is then added in a subsequent step. In this method, the halogen ion may comprise the same halogen or a mixture of two different halogens, as for example, chlorine and fluorine.

In some cases it may be desired to commingle an organic acid and particularly acetic acid which has been found to have a favorable effect on the catalyst. The acetic acid apparently serves to peptize the alumina and thereby renders it in a better condition for compositing with the platinum, and also partly to fix the platinum on the alumina so that migration of the platinum during subsequent heating is minimized. The amount of acetic acid, when employed, will generally be within the range of from about 0.05 to about 0.5 mol of acetic acid per mol of alumina.

Alumina prepared in the above manner, after washing and filtration, is generally recovered as a wet cake. The wet cake is usually made into a slurry with water and sent to a separate zone for further handling. When the halogen ion is to be added separately, it preferably is done at this stage of the catalyst preparation, that is, before the platinum is commingled with the alumina. The halogen ion may be added in any suitable manner. However, the halogen should be added in a form which will readily react with the alumina in order to obtain the desired results and also must not leave undesired deposits in the catalyst. A preferred method of adding the halogen is in the form of an acid, such as hydrogen fluoride, hydrogen chloride, hydrogen bromide and/or hydrogen iodide. Hydrogen fluoride is preferably added as an aqueous solution for ease in handing and for control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromide, or iodine but, in view of the fact that fluorine and chlorine normally exist as a gas, it is generally preferable to utilize them in the form of a solution for ease in handling. In some cases, the inclusion of certain components will not be harmful but may be beneficial, and in these cases the halogen may be added in the form of salts such as potassium fluoride, sodium fluoride, thorium fluoride, sodium chloride, potassium chloride, etc.

The concentration of halogen ion in the finished catalyst will be within the range of from about 0.1% to about 8% by weight of the alumina on a dry basis. The fluoride ion appears to be more active and therefore will be used within the range of from about 0.1% to about 3% by weight of the alumina on a dry basis. The chloride ion will be used within the range of from about 0.2% to about 8% and preferably from about 0.5% to about 5% by weight of the alumina on a dry basis. It has been found that halogen concentrations below these lower limits do not give the desired improvement and, on the other hand, concentrations of halogen above the upper limits adversely affect the selectivity of the catalyst, thus catalyzing side reactions to an extent greater than desired.

After the alumina and halogen have been intimately mixed, the platinum may be added in any suitable manner. A particularly preferred method is to form a separate solution of chloroplatinic acid in water and introduce hydrogen sulfide into this solution at room temperature, until the chloroplatinic acid solution reaches a constant coloration; that is, will not change color upon the addition of more hydrogen sulfide. The chloroplatinic acid solution is normally light yellow and, upon addition of hydrogen sulfide gas, turns to a dark brown color. Apparently the chloroplatinic acid and hydrogen sulfide react to form one or more complex chemical compounds. Best results have been obtained in this method when the hydrogen sulfide is added at room temperature to the chloroplatinic acid solution. The addition of hydrogen sulfide at an elevated temperature of 175° F. appears to produce less satisfactory catalysts. The brown solution of chloroplatinic acid and hydrogen sulfide may then be commingled with the slurry of wet alumina gel at room temperature, and the slurry sufficiently stirred to obtain intimate mixing of the two solutions.

In the preferred embodiment of the invention the platinum is added in an amount to produce a final catalyst containing from about 0.01% to about 1% by weight of platinum.

In another method of operation, chloroplatinic acid solution may be added to the slurry of alumina gel, and hydrogen sulfide then is added to the mixture. In this method of operation it has been found that the hydrogen sulfide may be added at room temperature or at an elevated temperature of 175° F.

In some cases, satisfactory catalysts may be produced by commingling the chloroplatinic acid solution with the slurry of alumina gel, and then drying and heating in the manner hereinafter set forth. In this method, hydrogen sulfide is not used. However, experiments have shown that the hydrogen sulfide addition is preferable because it tends to further fix the platinum in the form of an insoluble compound on the alumina so that the platinum compound will not migrate during the subsequent heating of the catalyst.

It has been found that best results are obtained when the platinum is composited with the alumina before the alumina is subjected to substantial heating. As will be shown in the following examples, a higher octane product was obtained when the chloroplatinic acid was added to the wet alumina gel as compared to adding the chloroplatinic acid to alumina which had previously been dried and formed into pills.

After the platinum in proper concentration has been commingled with the alumina, the mixture is preferably dried at a temperature of from about 200° to about 400° F. for a period of from about 4 to 24 hours or more to form a cake. In some cases it is desired to prepare the catalyst in the form of pills of uniform size and shape, and this may readily be accomplished by grinding the partially dried catalyst cake, adding a suitable lubricant, such as stearic acid, rosin, hydrogenated coconut oil, graphite, etc., and then forming into pills in any suitable pelleting apparatus. Particular satisfactory pills comprise those of a size ranging from about ⅛" x ⅛" to ¼" x ¼" or thereabouts. Pills of uniform size and shape may also be formed by extrusion methods. In some cases it may be desired to utilize the catalyst as powder or granules of irregular size and shape, in which cases the pilling and extrusion operations may be omitted.

The catalyst may now be subjected to high temperature treatment, and this may comprise one or several methods. Preferred method is to subject the catalyst to calcination at a temperature of from about 800° to about 1200° F. for a period of from about 2 to 8 hours or more. Another method is to subject the catalyst to reduction with hydrogen or hydrogen-containing gas at a temperature of from about 300° to about 600° F. for about 4 to 12 hours or more, preferably followed by calcination at a temperature of from about 800° to about 1200° F. In still another method the catalyst may be subjected to reduction with hydrogen or hydrogen-containing gas at a temperature of from about 800° to about 1200° F. for a period of from about 2 to 10 hours or more.

In some cases the lubricant will be removed during the high temperature heating. In other cases as, for example, when graphite is used as the lubricant, the separate high temperature heating step may be omitted, and the effective heat treatment of the catalyst may be obtained in the plant before or during processing of the hydrocarbons.

Although the catalyst of the present invention will have a long life, it may be necessary to regenerate the catalyst after long periods of service. The regeneration may be effected by treatment with air or other oxygen-containing gas to burn carbonaceous deposits therefrom. In general, it is preferred to control the regeneration temperature not to exceed about 1200° F. In some cases it may be desirable to follow the burning operation with treatment with hydrogen-containing gas at temperatures of from about 700° to about 1100° F.

The improved catalyst of the present invention may be employed in any process for which platinum is a catalyst. The improved catalysts are particularly satisfactory for reforming operations in which a saturated gasoline, such as straight run gasoline, natural gasoline, etc. is subjected to conversion to produce a reformed gasoline of improved anti-knock properties. The saturated gasoline generally comprises a mixture of naphthenic and paraffinic hydrocarbons and the reforming operations effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and converts higher boiling fractions to lower boiling fractions within the range of gasoline. However, this cracking must be controlled because excessive cracking produces excessive normally gaseous products and also excessive carbonaceous deposits on and deactivation of the catalyst. The improved catalysts of the present invention are particularly desirable for reforming operations because the catalyst effects the desired aromatization and controlled cracking under selected conditions of operation.

The catalyst of the present invention may also find utility in treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion when a selected fraction is so treated, it may be blended, all or in part, with the other fraction.

The catalyst of the present invention may prove particularly useful for destructive hydrogenation or hydrocracking reactions in which hydrocarbons and particularly oil heavier than gasoline is subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting hydrogenation reactions including the hydrogenation of unsaturated aliphatic hydrocarbons, such as mono-olefins, diolefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the novel catalysts. In reactions involving hydrogenation, oxidation or condensation, it is preferred that the halogen content of the catalyst be within the lower limits of the ranges hereinbefore specified in order to minimize side reactions.

As hereinbefore set forth, selected processing conditions are required depending upon the particular reaction desired. For reforming of straight run gasoline the temperature employed should be within the range of from about 600° to about 1000° F., the pressure within the range of from about 50 to about 1000 pounds per square inch and the weight hourly space velocity within the range of from about 0.5 to about 10. For dehydrogenation of normal butane the temperature should be within the range of from about 800° to about 1025° F., the pressure from about atmospheric to about 50 pounds per square inch and the gaseous hourly space velocity from about 200 to about 5000. For hydrogenation reactions the temperature may range from atmospheric to about 500° F., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the catalyst, and it is within the scope of the present invention to treat the hydrogen containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into a reaction zone as a slurry in the hydrocarbon oil.

The following examples are introduced to further illustrate the novelty and utility of the present invention, but not with the intention of unduly limiting the same.

EXAMPLE I

This example shows the effect of the addition of fluoride ions to the alumina.

These catalysts were prepared by adding ammonium hydroxide to aluminum chloride hexahydrate. The resultant alumina was washed very thoroughly in order to reduce the chlorine content of the alumina to below 0.1% by weight on a dry basis. This washing entailed six separate washes with large amounts of water containing a small amount of ammonium hydroxide and finally an additional wash with water. In one catalyst preparation (designated as catalyst No. 1 in the following table) hydrogen sulfide at room temperature was bubbled through an aqueous solution of chloroplatinic acid and the resultant solution was added to the alumina in an amount to produce a final catalyst containing 0.1% by weight of platinum on a dry basis. The composite was then dried for 17 hours at 572° F. and then reduced with hydrogen at 932° F. for 3 hours.

A second catalyst was prepared in substantially the same manner as described for catalyst No. 1, except that hydrogen fluoride was intimately mixed with the alumina before the chloroplatinic acid-hydrogen sulfide solution was added thereto. The hydrogen fluoride was added as a 4.8% aqueous solution and was added in an amount to produce a final catalyst containing 1.5% by weight of fluorine.

These catalysts were used for the reforming of a Pennsylvania straight run naphtha having a boiling range of from 226° to 350° F. and an A. S. T. M. motor method octane number of 41.8, at a temperature of about 874° F., pressure of 500 pounds per square inch and a weight hourly space velocity of about 2. The liquid volume yield and the A. S. T. M. motor method octane number of the products are indicated in the following table:

Table 1

| No. | Catalyst | Liquid Volume Yield Percent of Charge | Octane Number |
|---|---|---|---|
| 1 | No Fluorine in Catalyst | 96 | 59.8 |
| 2 | Catalyst containing 1.5% fluorine | 82.5 | 78.8 |

It will be noted that the catalyst containing fluorine yielded a reformate of 19 octane numbers higher than the catalyst containing no fluorine.

EXAMPLE II

This example shows the effect of the addition of different amounts of fluorine to the catalyst. Catalysts No. 3 and No. 4 correspond to catalyst No. 2 of Example I. Catalysts No. 5 and No. 6 were prepared in substantially the same manner as catalysts No. 3 and No. 4 except that the HF solution was added in an amount to produce a final catalyst containing fluorine in amounts of 3% for catalyst No. 5 and 6% for catalyst No. 6.

These catalysts were utilized for the reforming of the same gasoline described in Example I and under the same conditions of operation except that the temperature was varied as shown in the following table:

Table 2

| No. | Catalyst | Reforming Temp.; °F. | Reformate Yield Weight Percent of Charge | Exit Gas Weight Percent of Charge | Octane No. |
|---|---|---|---|---|---|
| 3 | 1.5% Fluorine | 824 | 95.9 | 3.6 | 65.7 |
| 4 | 1.5% Fluorine | 874 | 83.2 | 6.9 | 78.8 |
| 5 | 3% Fluorine | 824 | 85 | 4.9 | 77.4 |
| 6 | 6% Fluorine | 755 | 77.6 | 4.5 | 72.4 |

It will be noted from the above data that the temperature and fluoride concentration, at a constant space velocity, must be correlated in order to obtain the desired results. Referring to the run with catalyst No. 3, it will be noted that the temperature is too low because the octane number of the product was only 65.7. However, when the temperature was raised to 874° F., the octane number was increased to 78.8. Using the lower temperature (824° F.) with catalyst No. 5, satisfactory results were obtained. However, even lowering the temperature with catalyst No. 6 containing 6% fluorine, the octane number decreased. Therefore, the maximum fluorine content of the catalyst should not exceed about 3%.

EXAMPLE III

This example shows the effect of chlorine content of the catalyst.

Catalysts No. 7, No. 8 and No. 9 comprised 0.1% platinum-alumina. The washing procedures were controlled to retain 0.5, 1.5 and 3.5% chlorine in the final catalyst.

These catalysts were used for the reforming of a Pennsylvania straight run naphtha having an initial boiling point of 219° F., an end boiling point of 339° F. and an A. S. T. M. motor method octane number of 41.2. These tests were conducted at a temperature of about 872° F., a pressure of about 500 pounds per square inch and a space velocity of about 2. The results of these tests are shown in the following table:

Table 3

| No. | Catalyst | Liquid Volume Yield Wt. percent of Charge | Octane Number |
|---|---|---|---|
| 7 | 0.5% Chlorine | 92.3 | 64.2 |
| 8 | 1.5% Chlorine | 98.5 | 74.6 |
| 9 | 3.5% Chlorine | 93.4 | 76 |

It will be noted that the catalyst containing 0.5% chlorine produced a reformate of 64.2 octane number. Therefore, the chloride content of the catalyst preferably is not below about 0.5% and certainly should not be below about 0.2%. Catalysts No. 8 and No. 9 containing higher concentrations of chlorine produced higher octane number products. However, the chlorine content should not be increased above about 8% and preferably not above about 5% because the catalyst will produce excessive hydrocracking and result in an excess of gas formation.

EXAMPLE IV

This example shows the beneficial effects obtained in preparing the catalyst by the use of hydrogen sulfides in the manner hereinbefore set forth. Catalysts No. 10 and No. 11 were prepared in substantially the same manner except that in catalyst No. 11 the mixture of alumina and chloroplatinic acid was heated to 140° F. and hydrogen sulfide was bubbled through the mixture for 15 minutes with constant stirring. The results of these tests are indicated in the following table:

Table 4

| No. | Catalyst | Liquid Volume Yield Weight Percent of Charge | Octane Number |
|---|---|---|---|
| 10 | Without Hydrogen Sulfide | 96.2 | 69.3 |
| 11 | With Hydrogen Sulfide | 89.7 | 78.4 |

It will be noted that the catalyst prepared by the addition of hydrogen sulfide gave a higher octane number product than the catalyst prepared in the absence of hydrogen sulfide.

EXAMPLE V

This example shows the improved results obtained by adding chloroplatinic acid to wet alumina gel as compared to adding chloroplatinic acid to alumina which had been dried and formed into pills.

Catalyst No. 12 was prepared in substantially the same manner as hereinbefore set forth, while catalyst No. 13 was prepared by adding chloroplatinic acid to alumina pills which previously had been dried.

These catalysts were used for the reforming of a Mid-Continent straight run naphtha having an initial boiling point of 217° F., an end boiling point of 392° F. and an A. S. T. M. motor method octane number of 38.9. The reforming was effected at a temperature of 752° F., pressure of 200 pounds per square inch and a space velocity of 1. The results are shown in the following table:

Table 5

| No. | Catalyst | Liquid Volume Yield | Octane Number |
|---|---|---|---|
| 12 | Platinum added to wet alumina slurry. | 92.8 | 68.2 |
| 13 | Platinum added to dry alumina pills. | 97.6 | 50 |

It will be noted that the catalyst prepared by the addition of chloroplatinic acid to wet alumina slurry produced a considerably higher octane number product under the same conditions of operation.

EXAMPLE VI

This example shows the effect of temperature of hydrogen sulfide addition in catalysts prepared by adding the hydrogen sulfide to the chloroplatinic acid solution and then adding this mixture to the wet alumina slurry. In catalyst No. 14 in the hydrogen sulfide was added at room temperature, whereas in catalyst No. 15 the hydrogen sulfide was passed through a solution of chloroplatinic acid at 176° F. These catalysts were tested in the reforming of a Pennsylvania straight run naphtha having an initial boiling point of 226° F., and end boiling point of 350° F. and an A. S. T. M. motor method octane number of 41.8. The results of these tests are shown in the following table:

*Table 6*

| No. | Catalyst | Liquid Volume Yield | Octane Number |
|---|---|---|---|
| 14 | Hydrogen sulfide added at room temperature. | 96.7 | 60.1 |
| 15 | Hydrogen sulfide added at 176° F. | 97.7 | 56.4 |

It will be noted that the catalysts prepared by adding the hydrogen sulfide at room temperature produced a somewhat higher octane number product than the catalyst prepared by adding the hydrogen sulfide at an elevated temperature.

EXAMPLE VII

This example shows the effect of temperature of hydrogen sulfide addition in catalysts prepared by commingling the chloroplatinic acid with the alumina gel and then introducing the hydrogen sulfide.

Catalyst No. 16 was prepared by adding the hydrogen sulfide at room temperature, while catalyst No. 17 was prepared by adding the hydrogen sulfide at a temperature of 158° F. The results are shown in the following table:

*Table 7*

| No. | Catalyst | Liquid Volume Yield | Octane Number |
|---|---|---|---|
| 16 | Hydrogen sulfide added at room temperature. | 94.4 | 63.8 |
| 17 | Hydrogen sulfide added at 158°F. | 95.6 | 62.8 |

It will be noted that the results are fairly comparable in these tests and that the effect of temperature of hydrogen sulfide treatment is not substantial in catalysts prepared by adding hydrogen sulfide to the chloroplatinic acid-alumina gel mixture.

EXAMPLE VIII

In view of the very low concentrations of platinum found to be effective in catalyzing the reforming operation, the questions naturally arise as to whether such small amounts of platinum are actually of any effect and whether the platinum can not be omitted and the same results obtained. In order to definitely show that improved results are obtained through the use of these small amounts of platinum, two catalysts were prepared in substantially the same manner except that one catalyst comprised 0.1% by weight of platinum composited with alumina, and the other catalyst comprised alumina but contained no platinum.

In a reforming operation, a Pennsylvania straight run naphtha having a boiling range of from 226° F. to 350° F. and an A. S. T. M. motor method octane number of 41.8 was subjected to conversion in the presence of the platinum-containing catalyst and in the presence of the catalyst containing no platinum at a temperature of about 872° F., a pressure of 500 pounds per square inch and a weight hourly space velocity of about 2. The liquid volume yield and the A. S. T. M. motor method octane number of the products are indicated in the following table:

*Table 8*

| No. | Catalyst | Liquid Volume Yield per cent of Charge | Octane Number |
|---|---|---|---|
| 18 | 0.1% platinum alumina | 81.6 | 80 |
| 19 | alumina | 99 | 50.6 |

It will be noted that the catalyst containing no platinum yielded a product of 50.6 octane number, whereas the platinum containing catalyst yielded a product of 80 octane number. It is readily apparent that the 0.1% by weight of platinum exerts a definite catalytic effect.

I claim as my invention:

1. A method of manufacturing a catalyst which comprises combining a halogen with alumina in an amount of from about 0.1% to about 8% by weight of said alumina on a dry basis, commingling a platinum-containing solution with the halogen-containing alumina and calcining.

2. The method of claim 1 further characterized in that said halogen comprises fluorine in an amount of from about 0.1% to about 3% by weight of the alumina on a dry basis.

3. A method of manufacturing a catalyst which comprises combining a halogen with precipitated alumina in an amount of from about 0.1% to about 8% by weight of said alumina on a dry basis, commingling with the halogen-containing alumina a platinum-containing solution in an amount to form a final catalyst containing from about 0.01% to about 1% by weight of platinum and calcining at a temperature of from about 800° F. to about 1200° F.

4. The method of claim 3 further characterized in that said solution comprises chloroplatinic acid.

5. A method of preparing a catalyst which comprises precipitating alumina from aluminum chloride, commingling aqueous hydrogen fluoride with the alumina and combining fluorine with the latter in an amount of from about 0.1% to about 3% by weight of the alumina on a dry basis, commingling a chloroplatinic acid solution with the fluorine-containing alumina, and heating the resultant mixture to a temperature of from about 800° F. to about 1200° F.

6. A method of preparing a catalyst which comprises precipitating alumina from aluminum chloride, washing to remove chloride ions to below about 0.1% by weight of said alumina, combining fluorine with the alumina in an amount of from about 0.1% to about 3% by weight of said alumina, separately commingling hydrogen sulfide with a chloroplatinic acid solution, commingling the resultant solution with said alumina containing fluorine, and thereafter heating the resultant composite to a temperature of from about 800° F. to about 1200° F.

7. The method of claim 6 further characterized in that the hydrogen sulfide is added to said chloroplatinic acid solution at substantially room temperature and the mixture is commingled at about the same temperature with said alumina.

8. The method of claim 6 further characterized in that said fluorine is combined with the alumina by the addition of an aqueous solution of hydrogen fluoride.

9. A method of preparing a catalyst which comprises precipitating alumina from aluminum chloride, washing to remove chloride ions to below about 0.1% by weight of said alumina, combining chlorine with the alumina in an amount of from about 0.2% to about 8% by weight of said alumina, separately commingling hydrogen sulfide with a chloroplatinic acid solution, commingling the resultant solution with said alumina containing chlorine, and thereafter heating the resultant composite to a temperature of from about 800° to about 1200° F.

10. A method of preparing a catalyst which comprises precipitating alumina from aluminum chloride, washing to remove chloride ions to below about 0.1% by weight of said alumina, combining fluorine with the alumina in an amount of from about 0.1% to about 3% by weight of said alumina, adding chloroplatinic acid solution in an amount to form a final catalyst containing from about 0.1 to about 1% by weight of platinum, adding hydrogen sulfide to the resultant mixture, and thereafter heating the same to a temperature of from about 800° to about 1200° F.

11. A method of preparing a catalyst which comprises precipitating alumina from aluminum chloride, washing to remove chloride ions to below about 0.1% by weight of said alumina, combining chlorine with the alumina in an amount of from about 0.5% to about 5% by weight of said alumina, adding chloroplatinic acid solution in an amount to form a final catalyst containing from about 0.1% to about 1% by weight of platinum, adding hydrogen sulfide to the resultant mixture, and thereafter heating the same to a temperature of from about 800° to 1200° F.

12. A method of preparing a catalyst which comprises precipitating alumina from aluminum chloride, washing with water containing ammonium hydroxide to remove chloride ions to below about 0.1% by weight of said alumina, adding a dilute aqueous solution of hydrogen fluoride to said alumina in an amount to form a final catalyst containing from about 0.1% to about 3% by weight of fluorine based on said alumina, separately commingling hydrogen sulfide with a chloroplatinic acid solution in an amount to form a final catalyst containing from about 0.01% to about 1% by weight of platinum, commingling the resultant solution with said alumina containing fluorine and thereafter heating the resultant composite to a temperature of from about 800° to about 1200° F.

13. A method of preparing a catalyst which comprises precipitating alumina from aluminum chloride, washing with water containing ammonium hydroxide to remove chlorine ions to below about 0.1% by weight of said alumina, adding a dilute aqueous solution of hydrogen chloride to said alumina in an amount to form a final catalyst containing from about 0.5% to about 5% by weight of chlorine based on said alumina, separately commingling hydrogen sulfide with a chloroplatinic acid solution in an amount to form a final catalyst containing from about 0.01% to about 1% by weight of platinum, commingling the resultant solution with said alumina containing chlorine and thereafter heating the resultant composite to a temperature of from about 800° to about 1200° F.

14. A catalyst prepared by calcining a composite of alumina, platinum and halogen, in which composite the halogen has been combined with the alumina in an amount of from about 0.1% to about 8% by weight of said alumina on a dry basis, the platinum having been introduced as a platinum-containing solution.

15. A catalyst composite consisting essentially of alumina, platinum, and halogen combined with the alumina in an amount of from about 0.1% to about 8% by weight of the alumina on a dry basis, prepared by a process including the steps of introducing to alumina halogen in a form reactable with the alumina and platinum in the form of a platinum-containing solution, and calcining.

16. The catalyst composite of claim 15 further characterized in that said halogen comprises fluorine in an amount of from about 0.1% to about 3% by weight of the alumina.

17. The catalyst composite of claim 15 further characterized in that said halogen comprises chlorine in an amount of from about 0.5% to about 5% by weight of the alumina.

18. A catalyst composite consisting essentially of alumina, from about 0.01% to about 1% by weight of platinum, and halogen combined with the alumina in an amount of from about 0.1% to about 8% by weight of the alumina on a dry basis, prepared by a process including the steps of introducing to alumina halogen in a form reactable with the alumina and platinum in the form of a platinum-containing solution, and calcining.

19. A catalyst composite consisting essentially of alumina, from about 0.01% to about 1% by weight of platinum, and fluorine combined with the alumina in an amount of from about 0.1% to about 3% by weight of the alumina on a dry basis, prepared by a process including the steps of introducing to alumina fluorine in a form reactable with the alumina and platinum in the form of a platinum-containing solution, and calcining.

20. The catalyst composite of claim 18 further characterized in that said halogen comprises chlorine in an amount of from about 0.5% to about 5% by weight of the alumina.

VLADIMIR HAENSEL.

REFERENCES CITED

The following references are of record in the file of this patent:

UNITED STATES PATENTS

| Number | Name | Date |
|---|---|---|
| 2,317,683 | Greensfelder | Apr. 27, 1943 |
| 2,364,114 | Veltman | Dec. 5, 1944 |
| 2,400,012 | Littmann | May 7, 1946 |